United States Patent [19]
Studtmann et al.

[11] 3,958,174
[45] May 18, 1976

[54] MODULATED INDUCTION GENERATOR

[75] Inventors: George Henry Studtmann, Mount Prospect; Harry James Venema, Wheaton, both of Ill.

[73] Assignee: Borg-Warner Corporation, Chicago, Ill.

[22] Filed: Apr. 16, 1975

[21] Appl. No.: 568,746

[52] U.S. Cl. .............................. 322/47; 322/28; 322/94
[51] Int. Cl.² .................................................. H02P 9/00
[58] Field of Search ............... 322/47, 28, 20, 72, 322/94, 61; 321/45 C, 70

[56] References Cited
UNITED STATES PATENTS
| | | | |
|---|---|---|---|
| 3,829,758 | 8/1974 | Studtmann | 322/47 |
| 3,832,625 | 8/1974 | Gyugi | 322/47 |

*Primary Examiner*—J. D. Miller
*Assistant Examiner*—Robert J. Hickey
*Attorney, Agent, or Firm*—James J. Jennings, Jr.

[57] ABSTRACT

An induction machine is driven to operate as a generator, and has its electrical output conductors coupled to a switching system, which can be an inverter circuit. An oscillator and logic circuit are connected to regulate the switching of the power switches, such as thyristors, in the inverter circuit which operates as a switching system. The thyristors in the switching system are regulated to switch at a frequency sufficiently below the synchronous frequency of the induction machine to enable the machine to build up and operate as a generator. A modulator is connected to the oscillator to vary the oscillator frequency, and thus change the switching frequency of the switching system, above and below a reference level to provide a corresponding a-c output voltage, with a d-c average level, on the d-c bus conductors of the inverter circuit which operates as the switching system. The amplitude and frequency of the a-c output voltage are controllable over a wide range of variations in both the shaft speed of the induction machine and/or the electrical load. The system is also capable of producing an a-c voltage and a separate d-c voltage, and both the a-c and d-c voltages can be separately controlled.

16 Claims, 8 Drawing Figures

MODULATED INDUCTION GENERATOR

BACKGROUND OF THE INVENTION

A general discussion of induction machines is set out in U.S. Pat. No. 3,829,758, entitled "AC-DC Generating System", which issued to the assignee of this invention on Aug. 13, 1974. That patent discloses that the conventional capacitor bank or separate excitation source for an induction machine can be replaced by a static inverter circuit which operates not as an inverter but as a switching system to recirculate the reactive energy. The system of the earlier patent proved effective in providing an a-c output voltage on the output conductors of the machine (FIG. 6 of the patent), and/or a d-c output voltage on the switching system (inverter circuit) bus conductors. Furthermore it was shown in the earlier patent that the amplitude of the output voltage, whether a-c or d-c, is controllable over a wide range of variations in the shaft speed and/or the electrical load. As taught in that patent, the output voltage is a function of the slip frequency, which is the difference between the inverter switching (electrical) frequency and the machine (synchronous) frequency. By regulating the slip—or difference between the electrical frequency and synchronous frequency—the amplitude of the output voltage can be controlled. However in that system the a-c voltage was basically a "wild " frequency voltage; that is, the frequency varied with the synchronous speed of the induction generator. Accordingly it would be desirable to use such a system to produce an a-c output voltage which has a constant (or controllable) frequency, notwithstanding variations in the machine shaft speed and/or the electrical load.

It is therefore a principal consideration of this invention to provide such a system with a constant frequency a-c output voltage, which is maintained constant (or controlled) in spite of fluctuations in the induction machine shaft speed and/or variations in the electrical load supplied by the system.

From the subsequent explanation it will become apparent that the frequency-regulated a-c output voltage has a d-c average value. It is therefore another important consideration of this invention to produce such a system in which the a-c output voltage can be separated from the d-c average voltage, so that both a-c and d-c output voltages can be provided and independently controlled.

SUMMARY OF THE INVENTION

A system for providing an a-c output voltage constructed in accordance with this invention comprises a single-phase or a multi-phase induction machine having a mechanical input shaft for receiving rotational energy at a first frequency, and having a plurality of output conductors. A switching system, comprising a multi-phase inverter circuit, has a plurality of output connections coupled to the induction machine output conductors, a pair of bus conductors, and a plurality of power switches, such as thyristors, coupled both to the bus conductors and to the output connections. The power switches could also be power transistors, thyratrons, or other suitable switches known to those skilled in this art. The power switches are connected to receive gating signals to control their conduction and non-conduction and periodically direct the flow of reactive energy from one phase circuit to another phase circuit of the induction machine. A logic circuit is connected to apply gating signals to the power switches as a function of rceived timing signals, and an oscillator circuit is coupled to the logic circuit, for generating the timing signals to regulate operation of the switching system at a second frequency which is less than the first frequency.

Particularly in accordance with this invention, a modulator circuit is coupled to the oscillator circuit, for applying a modulating signal of given frequency to the oscillator and modifying operation of the switching system to switch at a frequency varying above and below the second frequency. Accordingly this system provides on the switching system bus conductors a modulated voltage, the envelope of which varies at the given frequency of the modulating signal.

In accordance with another aspect of the invention, a comparator circuit is connected to receive the modulating signal of given frequency, and another signal which is a function of the output signal on the bus conductors. The comparator output signal is applied to the oscillator circuit, to maintain the output voltage at the desired frequency and amplitude, notwithstanding variations in the synchronous speed of the machine and/or variations in the electrical load supplied by the system.

THE DRAWINGS

In the several figures of the drawings, like numerals designate like components, and in those drawings.

GENERAL BACKGROUND DISCUSSION

The teaching of U.S. Pat. No. 3,829,758 is hereby incorporated in, and made a part of, this disclosure.

Figure 1:
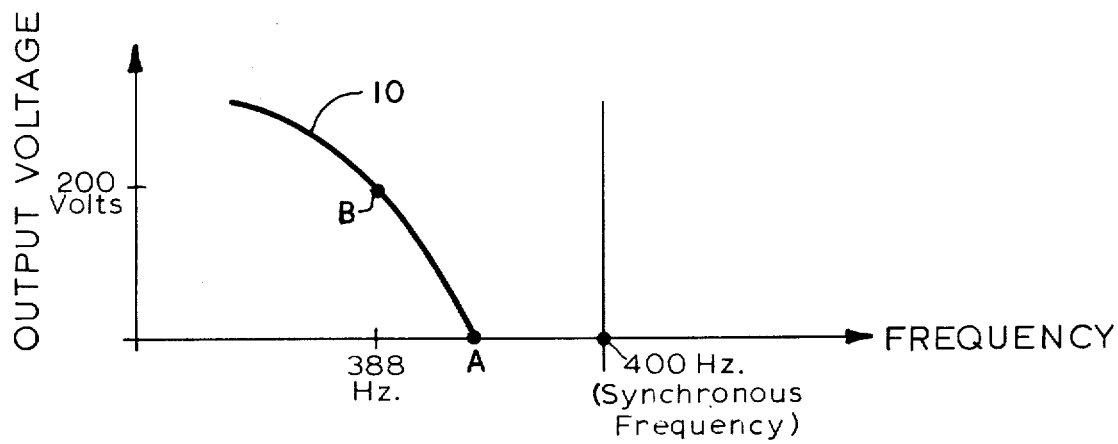
FIGS. 1–4 are graphical illustrations useful in understanding the invention.

Consider initially that the induction machine is rotating at a mechanical speed which corresponds to a synchronous electrical frequency of 400 Hertz (Hz.). If the actual electrical frequency is sufficiently less than 400 Hz., then the machine will operate as a generator. FIG. 1 depicts in curve 10 the variation of generator output voltage as a function of electrical frequency, given a constant load. As the electrical frequency is gradually reduced from 400 Hz., generator action will commence at a point designated A. The difference between the synchronous frequency of 400 Hz. and the lower frequency at point A is a function of the load, or an inverse function of the load resistance.

Assume, for purposes of explanation, that it is desired to operate the system at an electrical frequency of 388 Hz. and a voltage amplitude of 200 volts. This corresponds to operation at point B on curve 10. Now if the electrical frequency is varied as a function of time, so that it is sometimes greater and sometimes less than the reference frequency of 388 Hz., FIG. 2 indicates what will happen to the output voltage (as seen on the bus conductors of the switching system) as the electrical frequency swings above and below 388 Hz. The varying or modulating voltage is represented by curve 11, and the output voltage by curve 12. The output voltage attempts to follow the modulating voltage, so that the output voltage varies above and below 200 volts. Thus by modulation of the electrical frequency, a modulated output voltage can be produced as shown in FIG. 2.

Figure 3:
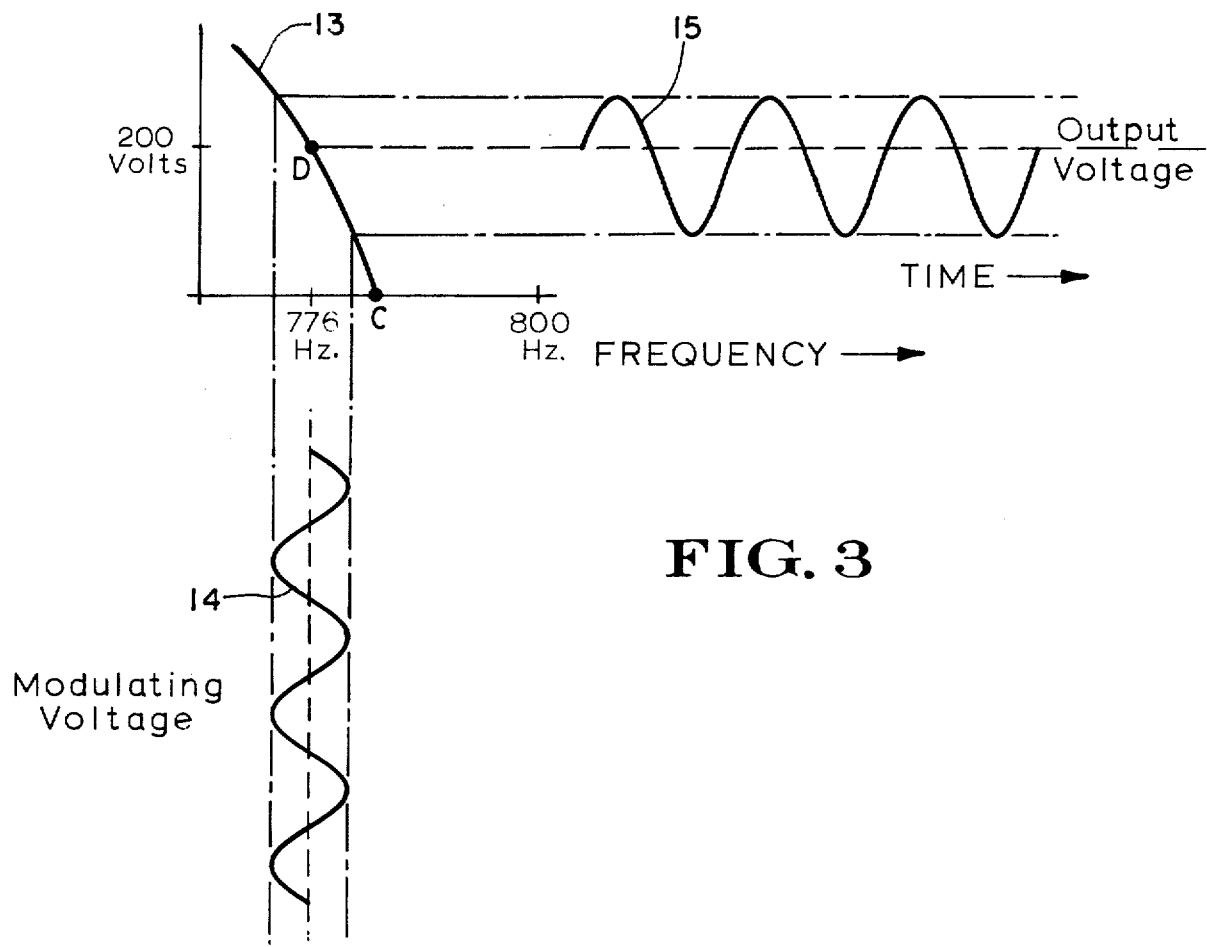

If the machine speed is doubled so that the synchronous frequency is now 800 Hz., the same modulation technique can be applied as shown in FIG. 3. As there indicated curve 13 represents operation with the machine generating, and the distance between point C and the 800 Hz. mark represents the load losses. In this system the reference frequency is 776 Hz., so that the reference point occurs at D on curve 13. The modulating frequency is set to swing from approximately 768 to 784 Hz., as shown by curve 14. The result is a modulated output voltage as shown in curve 15. It is noted that the output voltage has a frequency which depends only on the frequency of the modulating voltage shown in curve 14. The frequency of the output voltage shown in curve 15 is independent of the induction machine speed.

The change in machine speed does affect the shape of the voltage/frequency curve shown in FIG. 1. However, several different factors are involved in the modification of the curve shape, and as a first order approximation the curve shape can be considered constant for different operating frequencies.

Figure 2:
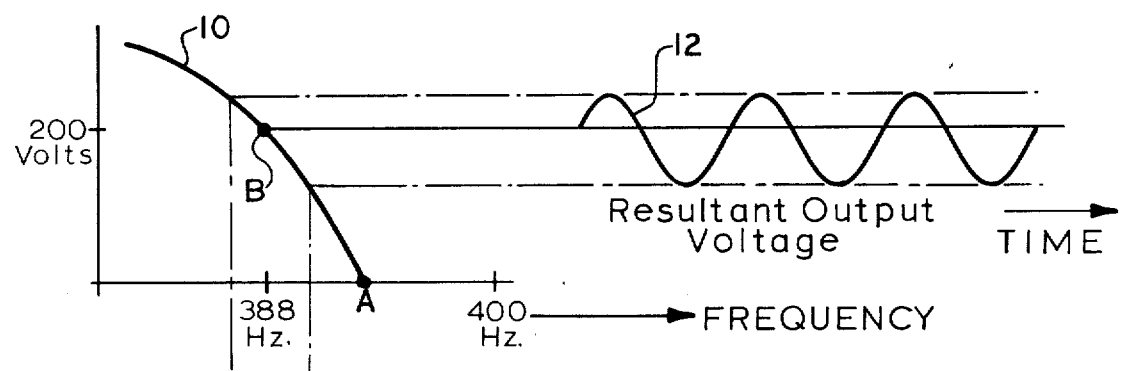
Figure 2:
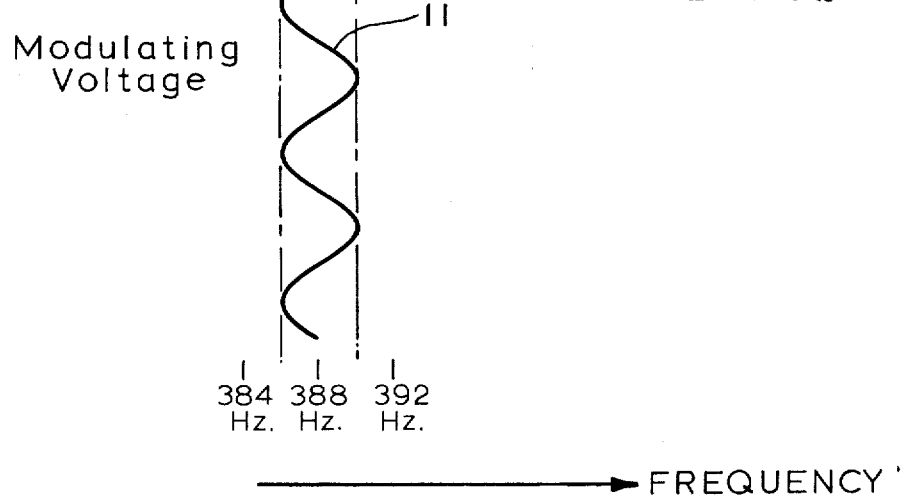

It will be apparent from inspection of FIGS. 2 and 3 that the amplitude and frequency of the output voltage represented by curve 12 are direct functions of the modulating signal represented by curve 11. That is, controlling the amplitude of the modulating signal 11 will correspondingly control the amplitude of the output voltage 12. Similarly a change in the frequency of modulating signal 11 will produce a corresponding change in the frequency of output voltage 12.

From the above it is apparent that the system has the capability of maintaining both the frequency and the amplitude of the a-c voltage envelope at desired values when the mechanical speed of the induction generator varies.

Figure 4:
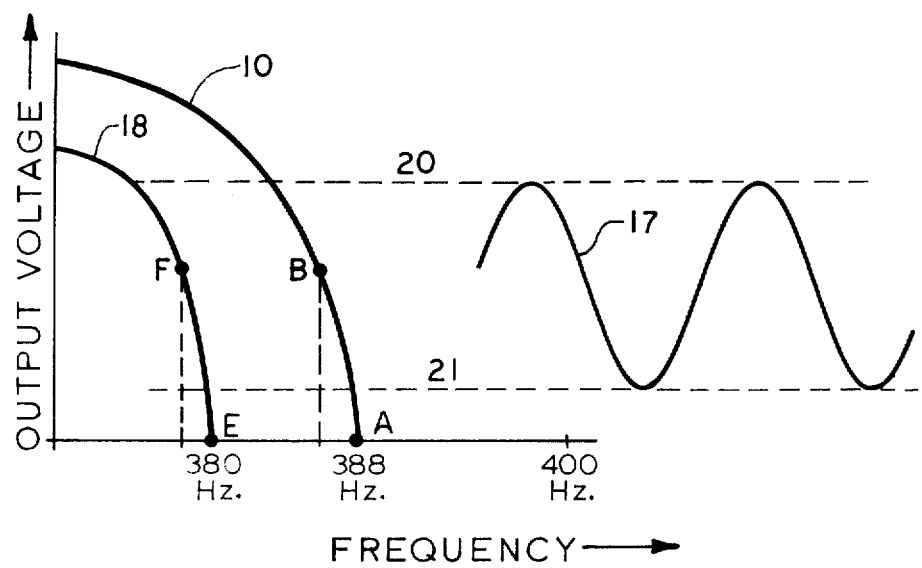

Considering load changes, if the synchronous frequency is maintained at 400 Hz. but the load is, say, doubled (that is, the resistance is halved), the voltage/frequency curve is changed as shown in FIG. 4. The initial generator build-up point now occurs at a lower frequency, represented by point E. In general the slip at the point where generator build-up first begins is inversely proportional to the load resistance. In addition, the maximum output voltage of the machine is somewhat less for the heavier load.

If it is now required to maintain the output voltage represented by curve 17 at the same amplitude, the modulation is adjusted to cause the frequency to vary about point F on curve 18. The output voltage swing would then remain bounded by the dashed lines 20, 21. It is apparent, therefore, from the foregoing explanation that it is possible to regulate the modulated output voltage of the system both variation frequency and amplitude by the technique described above, notwithstanding variations in the shaft speed of the machine and/or changes in the electrical load.

DETAILED DESCRIPTION OF THE INVENTION

Figure 5:
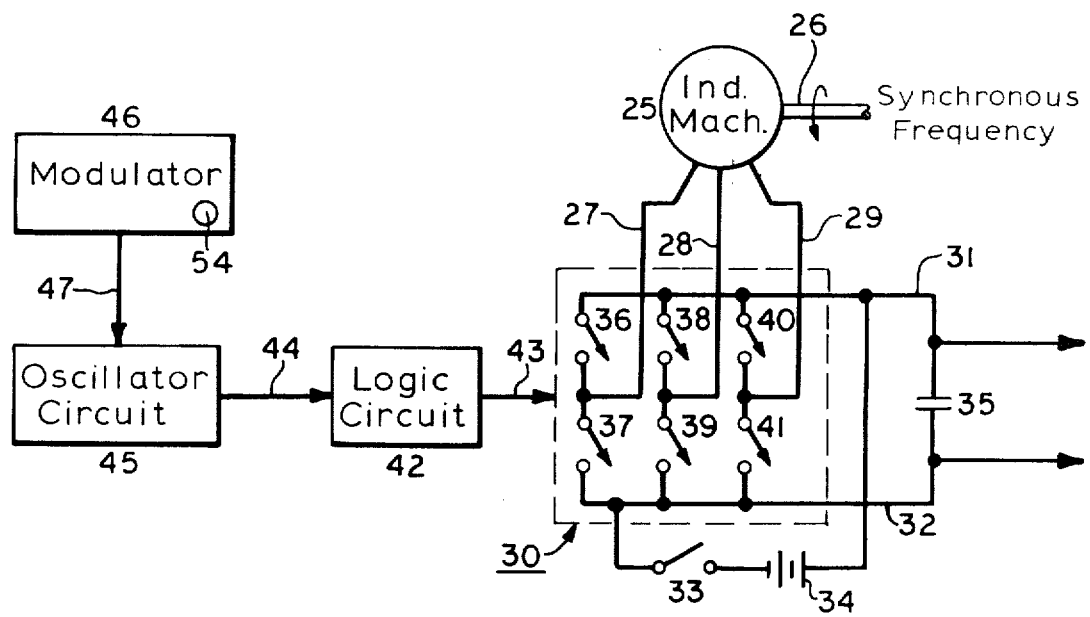
FIG. 5 is a block diagram of a system constructed in accordance with the invention.

FIG. 5 depicts in a block arrangement the basic subsystems of the present invention. An induction machine 25 has an input shaft 26 to receive mechanical drive for rotating the machine at a first or synchronous frequency. This corresponds to the synchronous frequencies shown in the drawings, such as 400 Hertz referenced in FIG. 1. The electrical output connections of the machine are coupled over conductors 27, 28 and 29 to a switching system 30 which can be an inverter circuit, as specifically illustrated in FIG. 7 of U.S. Pat. No. 3,829,758. The inverter circuit has a pair of bus conductors 31 and 32, which correspond to conductors 60, 61 in FIG. 7 of the reference patent. In addition an excitation system shown as switch 33 and battery 34 is provided to assist the system in the initial build-up. This corresponds to the circuit 16 in FIG. 7 of the reference patent and, like that circuit, can be disconnected after the system has been started. A capacitor 35 is coupled between bus conductors 31 and 32. Six power switches, shown as mechanical switches 36–41, are provided to conduct or interrupt the flow of current in response to receipt of turn-on (gating) signals or turn-off (commutation) circuit operation. The power switches can be thyristors, power transistors, vacuum tubes, or any appropriate switch. The turn-on and turn-off of the power switches within the switching system are regulated by signals generated in logic circuit 42 and applied over line 43 to the switching system 30. such a logic circuit can, by way of example, be of the "Three Stage SCR Ring Counter Circuit" type shown in FIG. 7.17 on page 109 of G.E.'s SCR manual second edition. In turn the logic circuit operation is determined by timing signals received over line 44 from an oscillator circuit 45. One suitable example of the oscillator arrangement will be set out in more detail in FIG. 6, but those skilled in the art will appreciate that various types of oscillators can be used, so long as an appropriate timing pulse is supplied to the logic circuit.

Particularly in accordance with the present invention, a modulator circuit 46 is provided and coupled over line 47 to the oscillator 45 to vary the timing of the pulses produced by the oscillator circuit. The modulator unit can be any of many different commercially available types, for example, such as the Hewlett-Packard Model No. 202A Function Generator. In relating the operation of the system of FIG. 5 to the showing of FIG. 2 in this disclosure, the induction machine 25 is rotated at a first (or synchronous) speed by the input mechanical energy. This synchronous frequency is that referenced 400 Hertz in FIG. 2. The electrical frequency of operation is established by timing the switching of the power switches in the switching system (inverter circuit) 30. This timing is accomplished by the frequency of the pulses produced in oscillator 45, in turn modulated by the input signal from modulator 46. This modulating signal is represented by the curve 11 in FIG. 2, where the electrical frequency is shown to vary above and below 388 Hertz as a function of the modulating signal applied. Without any modulation, the switching frequency would be kept constant at the reference frequency of 388 Hertz, and the output voltage on the bus conductors of switching system 30 would be a constant amplitude 200 volts d-c signal. With modulation, there is a swing or variation in output voltage to provide in effect an a-c signal on the bus conductors of the switching system. Of course the d-c component of the output voltage can be blocked by a series-connected capacitor in a manner known to those skilled in the art, so that only the a-c signal represented by curve 12 in FIG. 2 is provided on the output to the associated equipment. Thus the system of FIG. 5 provides a constant frequency on the output bus conductors.

Figure 6:
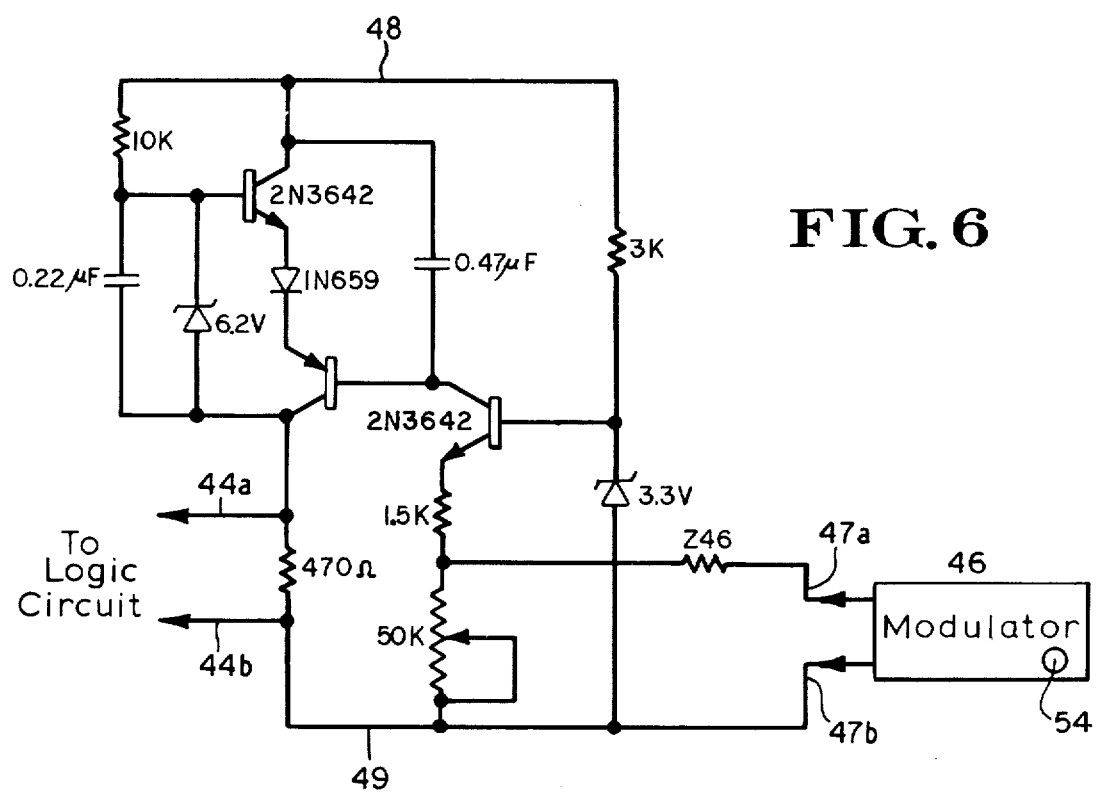
FIG. 6 is a schematic diagram of a circuit shown generally in FIG. 5.

FIG. 6 shows one circuit suitable for use as the oscillator 45 of the system shown in FIG. 5. In FIG. 6 the various components are shown with their specific identifications of transistor types, resistor values and so forth, to afford implementation of the invention with a minimum of experimentation. If desired a general background operating description of such an oscillator circuit is set out in U.S. Pat. No. 3,406,355, entitled "Oscillator Circuit", which issued to the assignee of this invention on Oct. 15, 1968. In FIG. 6 the modulator 46 provides a signal over an output impedance referenced $Z_{46}$ to the oscillator circuit to control the oscillator frequency. The oscillator was designed to operate with a voltage of 15 volts positive applied to conductor 48, with respect to the potential on the ground conductor 49. The output signal is provided over the two conductors referenced 44a and 44b for application to the logic circuit.

Figure 7:
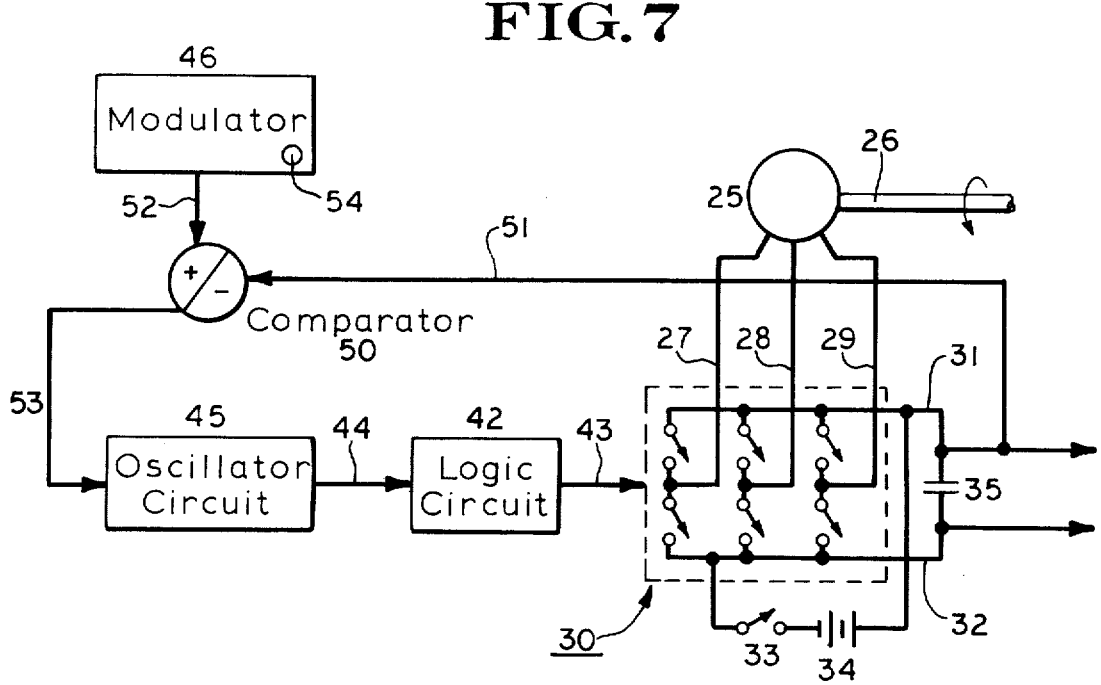
FIG. 7 is a block diagram showing the incorporation of a feedback loop in the system of FIG. 5.

The system described thus far has all the components required to produce an output voltage which is controllable both in frequency and amplitude, as a function of the modulating signal applied to the oscillator. Those skilled in the art will appreciate that a feedback loop can be added to the system shown in FIG. 5 to provide automatic, continuous regulation of the output voltage. FIG. 7 depicts such a system with the incorporation of a feedback loop.

As there illustrated the system is generally similar to that shown in FIG. 5, but a feedback loop including a comparator 50 is incorporated. The output voltage (or a portion of this voltage) is applied over line 51 to one input connection of comparator 50. The output of modulator 46, acting as a reference signal, is applied over line 52 to the other input connection of comparator 50. Accordingly the output voltage is compared to a reference voltage in comparator 50, and the resultant difference signal is applied over line 53 to control the oscillator 45. If now the reference voltage on line 52 is amplitude modulated at some relatively low frequency, then the output voltage will be conformed with the reference voltage by nature of the feedback system. Thus any variations of the machine speed and/or the load impedance will be compensated for by the feedback system.

As will be evident from examination of the various wave shapes, particularly wave shape 12 of FIGS. 2 and 3, the output voltage has both a d-c component and an a-c component. In order to obtain pure a-c, the d-c component must be separated or blocked, which can be done with a capacitor as is known to those skilled in the art. To obtain the pure d-c component, a low-pass filter, such as an LC filter, can be used to produce the d-c as well as the a-c component. This is illustrated more clearly in FIG. 8

As there is shown, both an a-c load 55 and a d-c load 56 are provided. A blocking capacitor 57 is coupled between the bus conductors 31, 32 and the a-c load 55, to block the d-c current. An LC filter including a series-connected inductor 58 and a parallel-connected capacitor 60 is coupled between the bus conductors and d-c load 56.

Figure 8:
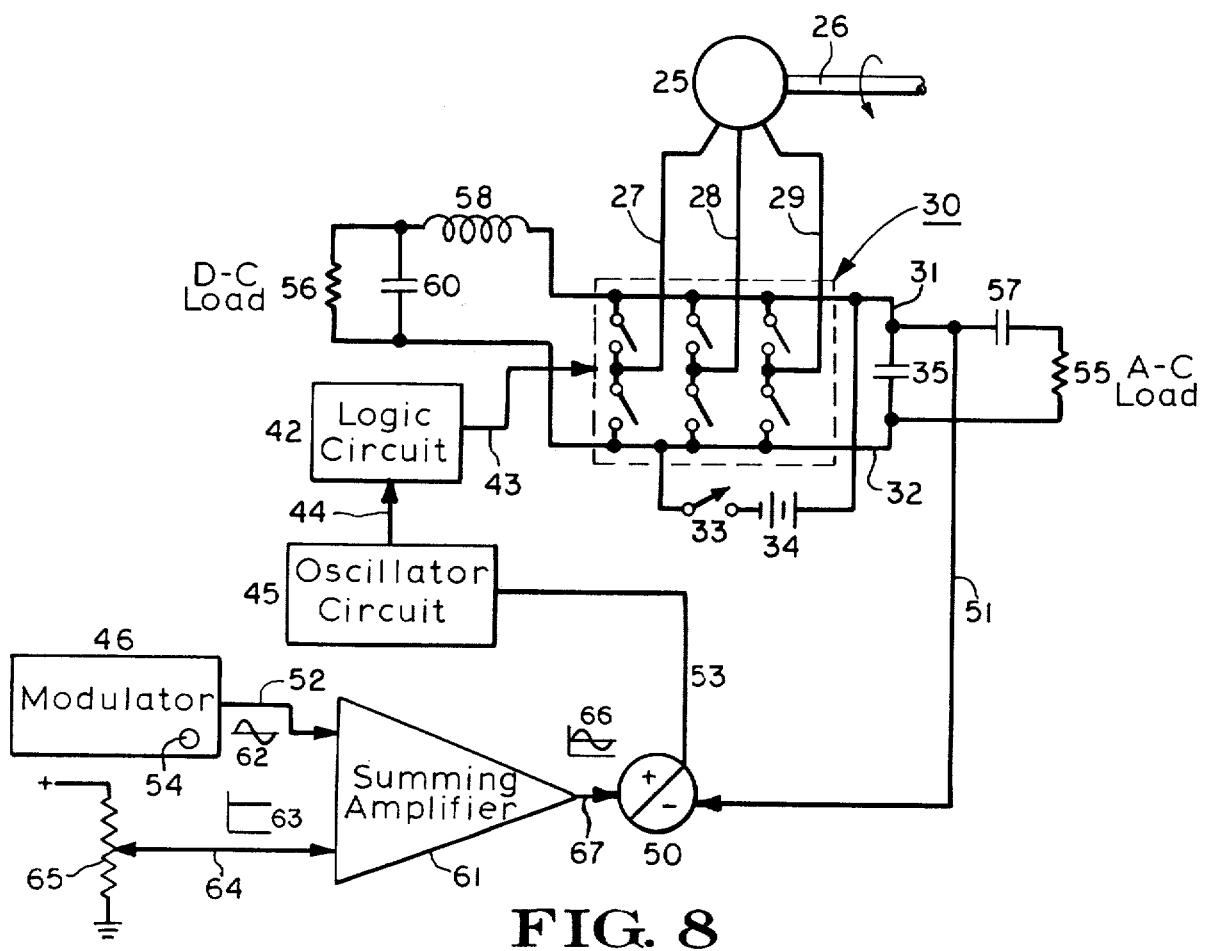
FIG. 8 is a block diagram illustrating a circuit for separating the a-c and d-c components of the output voltage.

Moreover the amplitudes of the a-c output voltage and the amplitude of the d-c output voltage can be independently controlled by the arrangement shown in FIG. 8. To this end a summing amplifier 61 is connected to receive both the modulating a-c signal 62, over line 52 from modulator 46, and an adjustable amplitude d-c reference signal 63, over line 64 from potentiometer 65. Thus the output signal 66 of the summing amplifier, having both a-c and d-c components, is applied over line 67 to comparator 50. The comparator 50 receives another input signal, representing both the a-c and d-c components of the system output voltage, over line 51. Thus the oscillator circuit 45 is controlled as a function of the difference between the actual system output voltage and the a-c and d-c signals established by modulator 46 and potentiometer 65. By varying, for instance, the d-c level set by potentiometer 65, the d-c output level of the summing stage 61 would shift but the a-c variation would not. This would then cause the oscillator frequency to be modulated in such a manner as to produce a corresponding output on the output bus conductors 31, 32. Similarly, if only the a-c signal 62 is changed in frequency or amplitude, the d-c signal level is held constant and summing amplifier 61 produces a summed reference signal with the a-c portion appropriately varied. The summing amplitude output is then compared with the system output voltage and appropriate corrections made until the system output has that same wave shape.

From the above, it is apparent that regulation of the system output voltage can be maintained independently of variations in the voltage on the output bus. Those skilled in the art will appreciate that the current sensing arrangement shown and described in the reference patent, particularly in FIG. 9 can be used in connection with this invention, to provide current limiting operation.

It is noted that the amplitude of the modulating voltage is always such, as shown for example in FIG. 2, that the swing or variation along the curve 10 does not extend to the right of the point A, where the curve 10 intersects the frequency axis. This is the point at which, with an increasing frequency, generating action would cease. If the operating frequency were thus increased to the point A where the induction machine was no longer generating, it would have to build up again when the frequency was again decreased to the initial build-up at point A. This would result in distortion of the resultant output voltage curve. To avoid this distortion, the amplitude of the modulating voltage is maintained such that a suitable range of the curve 10 is used and there is never any extension of the modulating signal into the region to the right of point A.

At this time the best mode known for practicing the invention is shown in FIG. 5, with modulator 46 connected to provide effective modulation of the signal produced by oscillator circuit 45. Additional refinements can be incorporated, as described in connection with FIGS. 7 and 8, but the basic system of FIG. 5 is employed in conjunction with these other embodiments.

In the appended claims the term "connected" means a d-c connection between two components with virtually zero d-c resistance between those components. The term "coupled" indicates there is a functional relationship between two components, with a possible interposition of other elements between the two components described as "coupled " and "inter-coupled".

While only particular embodiments of the invention have been described and claimed herein, it is apparent that various modifications and alterations of the invention may be made. It is therefore the intention in the appended claims to cover all such modifications and alterations as may fall within the true spirit and scope of the invention.

What is claimed is:

1. A system for providing an alternating output voltage having a d-c average value, comprising:
    an induction machine having a mechanical input shaft for receiving rotational energy at a first frequency, and having a plurality of output conductors;
    a switching system, comprising an inverter circuit including a plurality of output connections coupled to the induction machine output conductors, a pair of bus conductors, a plurality of power switches, coupled both to the bus conductors and the output connections, which power switches are connected to receive gating signals to control their conduction and non-conduction, and a capacitor coupled between the bus conductors;
    a logic circuit connected to apply gating signals to the power switches as a function of received timing signals;
    an oscillator circuit, coupled to the logic circuit, for generating the timing signals to regulate operation of the switching system at a second frequency which is less than the first frequency; and
    a modulator circuit, coupled to the oscillator circuit, for applying a modulating signal of given frequency to the oscillator and modifying operation of the switching system to switch at a frequency varying above and below the second frequency, thus providing on the switching system bus conductors a modulated voltage, the envelope of which varies at the given frequency of the modulating signal and as a function of the amplitude of the modulating signal.

2. A system for providing an alternating output voltage having a d-c average value, comprising:
    a multi-phase induction machine having a mechanical input shaft for receiving rotational energy at a first frequency, and having a plurality of output conductors;
    a switching system, comprising a multi-phase inverter circuit including a plurality of output connections coupled to the induction machine output conductors, a pair of bus conductors, and a plurality of power switches, coupled both to the bus conductors and the output connections, which power switches are connected to receive gating signals to control their conduction and non-conduction and periodically direct the flow of reactive energy from one phase circuit to another phase circuit of the induction machine;
    a logic circuit connected to apply gating signals to the power switches as a function of received timimg signals;
    an oscillator circuit, coupled to the logic circuit, for generating the timing signals to regulate operation of the switching system at a second frequency which is less than the first frequency; and
    a modulator circuit, coupled to the oscillator circuit, for applying a modulating signal of given frequency to the oscillator and modifying operation of the switching system to switch at a frequency varying above and below the second frequency, thus providing on the switching system bus conductors a modulated voltage, the envelope of which varies at the given frequency of the modulating signal and as a function of the amplitude of the modulating signal.

3. A system as claimed in claim 2 and further comprising:
    means, coupled between the bus conductors and an a-c load to be energized by the system, for blocking the d-c component of the alternating output voltage and passing only an a-c voltage to the a-c load.

4. A system as claimed in claim 2 and further comprising:
    means, coupled between the bus conductors and a d-c load to be energized by the system, for substantially reducing the a-c component of the output voltage and passing the filtered d-c voltage to the d-c load.

5. A system as claimed in claim 2 and further comprising:
    a comparator having first and second input connections and an output connection for providing an output signal which is the algebraic sum of the input signals received;
    means for coupling the comparator output connection to the oscillator circuit;
    means for coupling the first input connection of the comparator to the modulator circuit to receive the modulating signal; and
    means for coupling the second input connection of the comparator to one of said bus conductors, thus regulating the oscillator circuit by a signal which represents the difference between the actual output signal on the bus conductors and the desired signal as represented by the modulating signal passed from the modulator circuit to the comparator.

6. A system as claimed in claim 5 and further comprising:
    a summing amplifier, having an output connection and a pair of input connections;
    means for coupling the summing amplifier output connection to the first input connection of the comparator circuit;
    means for coupling the first input connection of the summing amplifier to the modulator circuit to receive the modulating signal;
    means for establishing an adjustable reference d-c voltage signal; and
    means for coupling the second input connection of the summing amplifier to the means for establishing the adjustable reference d-c voltage signal, such that the resultant signal passed from the summing amplifier to the first input connection of the comparator is adjustable as to d-c level by adjusting the means for establishing the adjustable reference d-c voltage signal and is adjustable as to both frequency and amplitude of the modulating signal by adjustment of the modulator circuit, to provide a corresponding regulation of the output voltage on the system bus conductors.

7. A system as claimed in claim 6 and further comprising:
    means, coupled between the bus conductors and an a-c load, for blocking the d-c component of the alternating output voltage and passing only an a-c voltage to the a-c load, such that the effective frequency and amplitude of the a-c output voltage can be regulated by adjustment of the modulating signal provided by the modulator circuit.

8. A system as claimed in claim 6 and further comprising:

a filter, coupled between the bus conductors and a d-c load, for effectively minimizing the a-c component of the voltage provided to the load, such that the effective amplitude of the voltage passed from the bus conductors to the d-c load can be adjusted by adjusting the means for establishing the adjustable reference d-c signal applied to the summing amplifier.

9. A system for providing an alternating output voltage having a d-c average value, comprising:
an induction machine having a mechanical input shaft for receiving mechanical rotational energy at a first frequency, and having a plurality of output conductors;
a switching system, comprising an inverter circuit including a plurality of output connections coupled to the induction machine output conductors, a pair of bus conductors, a plurality of thyristors, coupled both to the bus conductors and the output connections, which thyristors are connected to receive gating signals to control their conduction and non-conduction, and a capacitor coupled between the bus conductors;
a logic circuit connected to apply gating signals to the thyristors as a function of received timing signals;
an oscillator circuit, coupled to the logic circuit, for generating the timing signals to regulate operation of the switching system at a second frequency which is less than the first frequency; and
a modulator circuit, coupled to the oscillator circuit, for applying a modulating signal of given frequency and amplitude to the oscillator and modifying operation of the switching system to switch at a frequency varying above and below the second frequency, thus providing on the switching system bus conductors a modulated voltage, the envelope of which varies at the given frequency of the modulating signal and as a function of the amplitude of the modulating signal.

10. A system for providing an alternating output voltage having a d-c average value, comprising:
a three-phase induction machine having a mechanical input shaft for receiving mechanical rotational energy at a first frequency, and having a plurality of output conductors;
a switching system, comprising a three-phase inverter circuit including a plurality of output connections coupled to the induction machine output conductors, a pair of bus conductors, and a plurality of thyristors, coupled both to the bus conductors and the output connections, which thyristors are connected to receive gating signals to control their conduction and non-conduction and periodically direct the flow of reactive energy from one phase circuit to another phase circuit of the induction machine;
a logic circuit connected to apply gating signals to the thyristors as a function of received timing signals;
an oscillator circuit, coupled to the logic circuit, for generating the timing signals to regulate operation of the logic circuit and thus of the switching system at a second frequency which is less than the first frequency; and
a modulator circuit, coupled to the oscillator circuit, for applying a modulating signal of given frequency and amplitude to the oscillator and modifying operation of the switching system to switch at a frequency varying above and below the second frequency, thus providing on the switching system bus conductors a modulated voltage, the envelope of which varies at the given frequency of the modulating signal and as a function of the amplitude of the modulating signal.

11. A system as claimed in claim 10 and further comprising:
means, coupled between the bus conductors and an a-c load to be energized by the system, for blocking the d-c component of the alternating output voltage and passing only an a-c voltage to the a-c load.

12. A system as claimed in claim 10 and further comprising:
means, coupled between the bus conductors and a d-c load to be energized by the system, for substantially reducing the a-c component of the output voltage and passing the resultant filtered d-c voltage to the d-c load.

13. A system as claimed in claim 10 and further comprising:
a comparator having first and second input connections and an output connection for providing an output signal which is the algebraic sum of the input signals received;
means for coupling the comparator output connection to the oscillator circuit;
means for coupling the first input connection of the comparator to the modulator circuit to receive the modulating signal; and
means for coupling the second input connection of the comparator to one of said bus conductors, thus regulating the oscillator circuit by a signal which represents the difference between the actual output signal on the bus conductors and the desired signal as represented by the modulating signal passed from the modulator circuit to the comparator.

14. A system as claimed in claim 13 and further comprising:
a summing amplifier, having an output connection and a pair of input connections;
means for coupling the summing amplifier output connection to the first input connection of the comparator circuit;
means for coupling the first input connection of the summing amplifier to the modulator circuit to receive the modulating signal;
means for establishing an adjustable reference d-c voltage signal; and
means for coupling the second input connection of the summing amplifier to the means for establishing the adjustable reference d-c voltage signal, such that the resultant signal passed from the summing amplifier to the first input connection of the comparator is adjustable as to d-c level by adjusting the means for establishing the adjustable reference d-c voltage signal and is adjustable as to both frequency and amplitude of the modulating signal by adjustment of the modulator circuit, to provide a corresponding regulation of the output voltage on the system bus conductors.

15. A system as claimed in claim 10 and further comprising:
a capacitor, coupled between the bus conductors and an a-c load, for blocking the d-c component of the alternating output voltage and passing only an a-c voltage to the a-c load, such that the effective frequency and amplitude of the a-c output voltage can be regulated by adjustment of the modulating signal provided by the modulator circuit.

16. A system as claimed in claim 10 and further comprising:
a filter, coupled between the bus conductors and a d-c load, for effectively minimizing the a-c component of the voltage provided to the load, such that the effective amplitude of the voltage passed from the bus conductors to the d-c load can be adjusted by adjusting the means for establishing the adjustable reference d-c signal applied to the summing amplifier.

* * * * *